United States Patent
Joos et al.

(10) Patent No.: US 7,225,075 B2
(45) Date of Patent: May 29, 2007

(54) METHOD FOR OPERATING AN INJECTION VALVE OF AN INTERNAL COMBUSTION ENGINE

(75) Inventors: Klaus Joos, Walheim (DE); Juergen Pantring, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 64 days.

(21) Appl. No.: 10/540,715

(22) PCT Filed: Nov. 5, 2003

(86) PCT No.: PCT/DE03/03660

§ 371 (c)(1),
(2), (4) Date: Jun. 20, 2005

(87) PCT Pub. No.: WO2004/070195

PCT Pub. Date: Aug. 19, 2004

(65) Prior Publication Data

US 2006/0116810 A1 Jun. 1, 2006

(30) Foreign Application Priority Data

Feb. 8, 2003 (DE) ................................ 103 05 178

(51) Int. Cl.
*F02D 41/22* (2006.01)
(52) U.S. Cl. ...................................... 701/107; 123/479
(58) Field of Classification Search ............... 701/105, 701/107; 123/295, 406.13, 447, 690, 479; 73/49.7, 119 A
See application file for complete search history.

(56) References Cited

U.S. PATENT DOCUMENTS

| 2001/0025626 A1 | 10/2001 | Antonioli et al. |
| 2002/0112528 A1 | 8/2002 | Antonioli et al. |
| 2004/0046138 A1 | 3/2004 | Stein et al. |

FOREIGN PATENT DOCUMENTS

| DE | 196 26 690 | 1/1998 |
| DE | 101 23 218 | 11/2002 |
| EP | 1 205 657 A2 | 5/2002 |
| EP | 0 860 600 B1 | 9/2003 |
| EP | 1 118 761 B1 | 4/2005 |
| FR | 2 762 358 | 10/1998 |
| JP | 11-13502 | 1/1999 |

*Primary Examiner*—Stephen K. Cronin
*Assistant Examiner*—Arnold Castro
(74) *Attorney, Agent, or Firm*—Michael J. Striker

(57) ABSTRACT

A method for operating an injection valve of an internal combustion engine, whereby the metering of fuel is adjustable in particular by varying the stroke of the nozzle needle of the injection valve, makes it possible to prevent an incomplete closure of the valve due to soiling (the risk of damage caused by a gasoline-filled cylinder) in operating states of the internal combustion engine in which no complete strokes of the nozzle needle occur over a prolonged period of time and the nozzle is therefore not sufficiently scavenged. The nozzle is scavenged with fuel when a jammed-open operating state of the nozzle needle is detected.

14 Claims, 3 Drawing Sheets

METHOD FOR OPERATING AN INJECTION VALVE OF AN INTERNAL COMBUSTION ENGINE

BACKGROUND OF THE INVENTION

The present invention relates to a method for operating an injection valve of an internal combustion engine, whereby the metering of fuel is adjustable in particular by varying the stroke of the nozzle needle of the injection valve. The present invention also relates to a computer program and a control device for carrying out the method, and an internal combustion engine with a control device of this type.

High-pressure fuel injection valves for direct fuel injection in the context of internal combustion engines are generally known. Specific types of high-pressure fuel injection valves 300, as shown in FIG. 3, are also known, in particular, with which it is possible to meter the fuel to be injected into the combustion chambers of the internal combustion engine via the opening time of the valve, and, in particular, by varying the stroke of valve needle 330. With these valves, nozzle needle 330 is actuated, e.g., directly with the aid of a piezoelectric actuator 320. Valves of this type are suited in particular for transmitting very short injection pulses and a plurality of injection pulses during a single working cycle, i.e., "multiple injection", within a very short time window. An example of a nozzle used with a valve of this type is the outwardly opening nozzle, i.e., the "A" nozzle.

In the related art, the needle stroke with the injection valves described—which allow the nozzle needle stroke to be varied—is limited in terms of high values and low values for the valve stroke using diverse restrictions:

The needle stroke is limited in terms of high values, for example, by
- the possibilities for realizing a required small amount, because the nozzle surface and the fuel system pressure are specified by the combustion method used and are variable, although in a limited manner;
- the size of piezoelectric actuators 320 that can be inserted, and by their physical properties, such as their stroke capacity, the amount of force they can apply, their ability to accelerate, etc.; and by
- the capacity of the end stage of the control device (power dissipation, installation space).

In contrast, the needle stroke under rated operating conditions of the internal combustion engine, i.e., the nominal needle stroke in terms of small stroke values, i.e., in the form of a minimum needle stroke, is limited by
- the need to ensure an adequate scavening effect.

The purpose of this minimum needle stroke is to ensure that, under rated operating conditions of the internal combustion engine, when the injection valve is operated primarily with the nominal stroke, a valve is prevented from closing incompletely or jamming open due to the presence of particles in the cross section of the injection nozzle.

The assurance of an adequate scavenging effect is particularly important because it prevents the risk of damage caused by a gasoline-filled cylinder. Damage caused by a gasoline-filled cylinder occurs when the cross section of the injection valve is blocked by dirt particles, thereby preventing the injection valve from closing completely. In this case, fuel is delivered continuously into the cylinder whose injection valve is jammed. Since fuel can be considered to be an incompressible medium, the piston motion is hindered or blocked when the amount of fuel injected exceeds the compression volume of the cylinder. If other cylinders in the internal combustion engine are functioning properly at this time, they exert—via the crankshaft—very strong forces on the connecting rod and the piston of the blocked cylinder, which usually results in irreparable engine damage, particularly in the form of the connecting rod breaking and a damaged cylinder.

As described above, soiling of the nozzle with dirt particles is prevented via specification of the minimum needle stroke under rated operating conditions.

This specification of the minimum needle stroke applies only for the rated operating conditions of the internal combustion engine, however. It does not rule out the fact that the injection valve must also be closed completely at times between individual injection impulses and/or strokes of the nozzle needle. This applies in particular for operating states with a low fuel requirement, e.g., during idle, when the nozzle needle is actuated for a prolonged period of time not with complete strokes, as is the case under rated operating conditions, but only with partial strokes. In these operating states of the internal combustion engine, an adequate scavenging effect is no longer ensured, due to the partial-stroke actuation. This results in a greatly increased risk that the injection nozzle will become soiled and make it more difficult to detect such soiling.

During idle operation in particular, two injection cycles of a cylinder can be separated by a long period of time. As a result, only relatively few injection events are available for diagnosing the undesired jammed-open operating state of the nozzle needle; this makes diagnosis of this operating state less reliable overall.

SUMMARY OF THE INVENTION

Based on this related art, the object of the present invention is to further develop known methods for operating an injection valve of an internal combustion engine, known computer programs and control devices for carrying out this method, and known internal combustion engines with a control device of that type, such that soiling of the nozzle of the injection valve by particles and, associated therewith, the risk of damage caused by a gasoline-filled cylinder, is more easily detected and prevented.

This object is attained by the subject of claim 1. According thereto, the object of the invention is attained in particular by the fact that a method for operating an injection valve of an internal combustion engine, in which the metering of fuel is adjustable by varying the injection time and stroke of the nozzle needle of the injection valve, is composed of the following steps:

This object of the invention is attained in particular by the fact that a method for operating an injection valve of an internal combustion engine, in which the metering of fuel is adjustable by varying the injection time and stroke of the nozzle needle of the injection valve, is composed of the following steps:
a) The internal combustion engine is monitored for proper functioning;
b) A jammed-open operating state of the nozzle needle of the injection valve is detected, due to soiling in particular, whereby the nozzle of the injection valve cannot be closed any further by the nozzle needle, but it can be opened further; and
c) The nozzle is scavenged with fuel by setting an essentially maximum stroke of the nozzle needle to remove the soiling.

Advantageously, dirt particles in the cross section of the injection valve are rinsed away by the large amount of fuel that acts in a case of scavenging of this type, and by the strong pressure that is then applied. The nozzle is then free of dirt particles and can be closed completely again. The risk of damage caused by a gasoline-filled cylinder is therefore prevented. By scavenging the nozzle, the original spray pattern of the nozzle is also restored, if it was previously impaired by the dirt particles. Restoration of the spray pattern results in improved efficiency of the internal combustion engine.

Importantly, it must also be possible for several embodiments to be carried out simultaneously. To detect a jammed-open operating state, it is sufficient when one of conditions for detection is met.

Advantageously, the increased amount of fuel delivered with a complete stroke within the framework of scavenging can be compensated for by reducing the duration of actuation $t_i$.

When the valve jam in an open position, fuel flows continuously into the combustion chamber of the internal combustion engine. This results in level of engine torque that is higher than desired. Advantageous remedies for the occurrence of this undesired additional torque are provided in the invention.

To reduce excess amounts of fuel and prevent incorrect actuation of scavenging according to step c), it is advantageous when the execution of step c) is blocked for a predetermined period of time before it is allowed to continue.

The object described above is also attained using a computer program and a control device for carrying out the method, and by an internal combustion engine using a control device of this type. The advantages of these means of attaining the object correspond to the advantages described above in terms of the method according to the present invention.

The present invention is described in detail below in the form of various exemplary embodiments and will be described in greater detail with reference to the three figures associated with the drawing.

DESCRIPTION OF THE PREFERRED EMBODIMENTS

The method according to the present invention serves to prevent soiling of nozzle 310 of injection valve 300, in particular during operating states in which a small amount of fuel is required, such as idling.

To this end, the method according to a step Sa) provides that the internal combustion engine is monitored for proper functioning. This monitoring can take place via one of four methods, according to the present invention.

In one form of this monitoring, the air-fuel mixture of the internal combustion engine is monitored to determine when it becomes rich, as indicated by method step Sa1. The fuel mixture is determined to have become richer typically via a reduction in the lambda value for the cylinder involved.

According to a second form of monitoring the internal combustion engine, said internal combustion engine or any of its cylinders is monitored for the occurrence of misfires, as proposed in method step Sa2. In this case, a misfire is understood to mean absence of combustion during an ignition cycle.

In a third form of monitoring, proper functioning of the internal combustion engine can also be monitored by monitoring the pressure in a fuel accumulator 110 assigned to the internal combustion engine. If this pressure drops, proper operation of the internal combustion engine is not ensured (Sa3).

Finally, according to a fourth method of monitoring, individual cylinders of the internal combustion engine are observed to detect increases in torque or torque irregularities (Sa4).

All four of the monitoring methods described according to method steps Sa1, Sa2, Sa3 and Sa4 can be carried out alone or in any combination with each other. Reference to the possible combinations is made in some of the claims using the wording: "—possibly in addition—" and "—possibly also—".

Figure 1A:
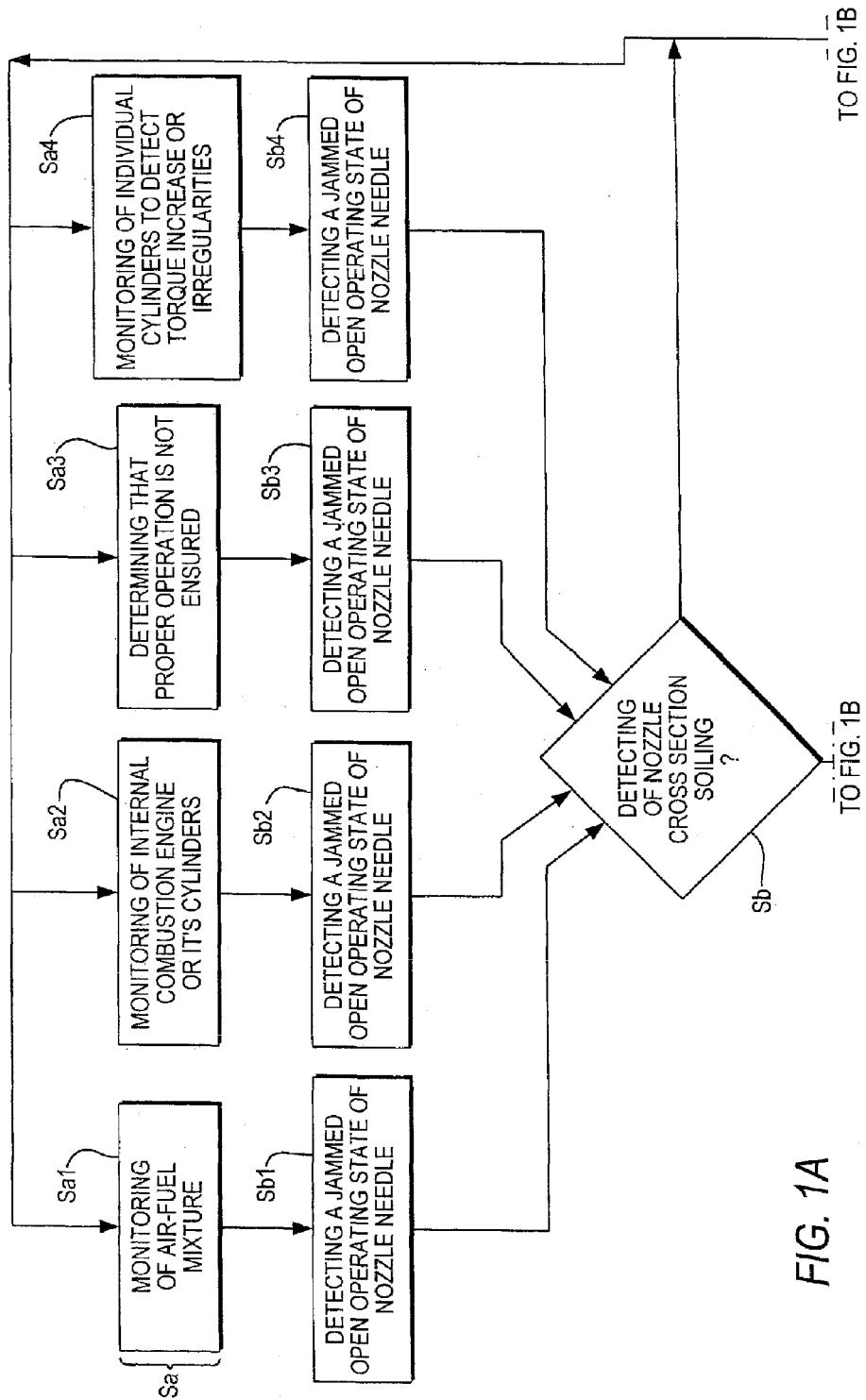
FIG. 1 shows the method for operating an injection valve of an internal combustion engine according to the present invention.
Figure 1B:
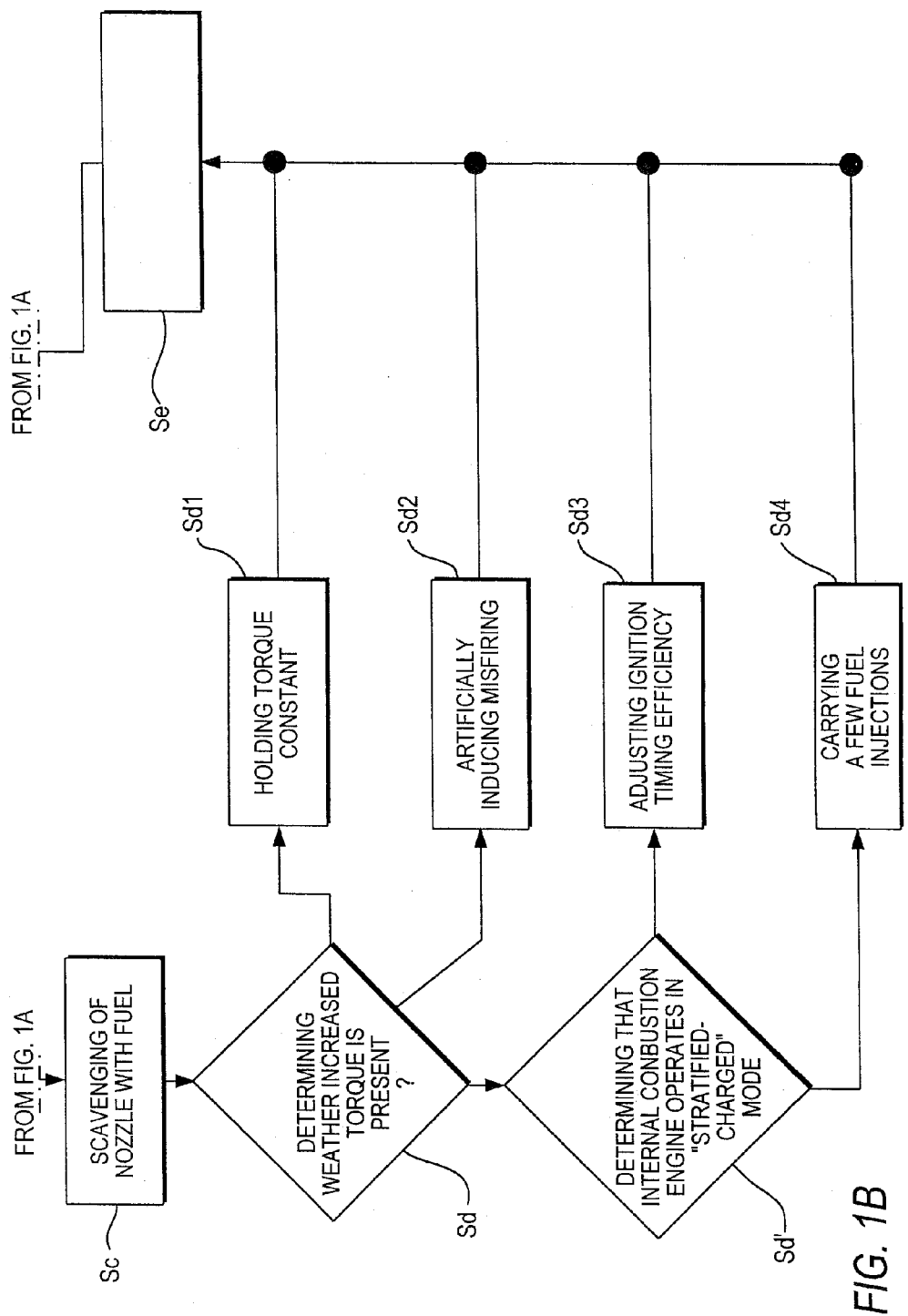
Figure 2:
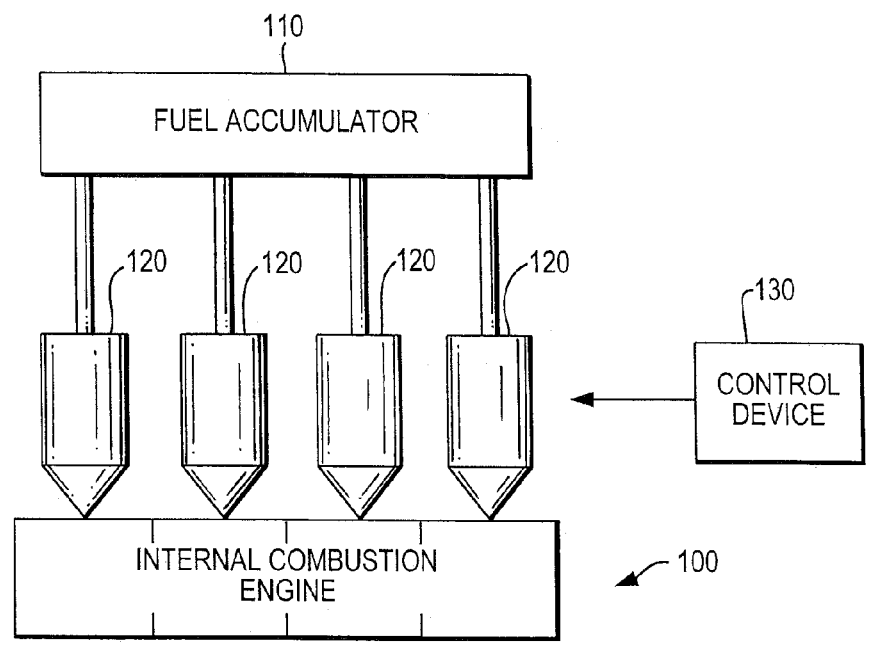
FIG. 2 shows an internal combustion engine with associated valve injection according to the present invention.
Figure 3:
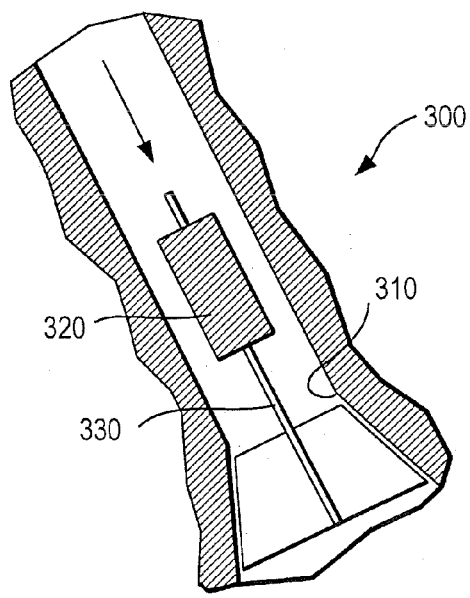
FIG. 3 shows an injection valve with variation of the stroke of the nozzle needle according to the state of the art.

Within the framework of the present invention, it makes sense to monitor the internal combustion engine only when the findings obtained by monitoring are also evaluated in terms of an undesired and detectable jammed-open operating state of nozzle needle 330 of injection valve 300. As shown in FIG. 1, this evaluation is based on the monitoring of the internal combustion engine carried out previously in step Sa). For example, according to a method step Sb1 for the case in which the fuel mixture of the internal combustion engine was monitored according to method step Sa1 to determine whether it had become richer, a jammed-open operating state of the nozzle needle is detected when the richness of the fuel mixture is greater than a specifiable enrichment threshold value or when the gradient of the enrichment is greater than a specifiable enrichment gradient threshold value. In the same manner, when the internal combustion engine is monitored according to method step Sa2 to detect misfires, a jammed-open operating state of the nozzle needle is detected according to method step Sb2 when the number of misfires detected in a cylinder per unit of time exceeds a specifiable threshold for frequency. When the internal combustion engine is monitored according to method step Sa3 to detect a pressure drop in fuel accumulator 110, a jammed-open operating state of nozzle needle 330 is detected according to method step Sb3 when the pressure in fuel accumulator 110 falls below a specifiable threshold for pressure or when the course of pressure in fuel accumulator 110 over time deviates from a specifiable expected pressure gradient by more than a specifiable, expected course of pressure over time. Finally, when the internal combustion engine is monitored according to method step Sa4, torque increases or irregularities detected during stratified-charge operation indicate that a valve is not closing completely, i.e., they indicate a jammed-open operating state of nozzle needle 330 when the identified torque increases or irregularities exceed a specified threshold value.

In method step Sb according to FIG. 1, a check is carried out to determine whether a jammed-open operating state of nozzle needle 330 is detected, at least in accordance with one of the method steps Sb1, Sb2, Sb3 or Sb4. If this is not the case, the monitoring is continued according to method step Sa). If a jammed-open operating state of nozzle needle 330 is detected, however, i.e., when it is detected that said nozzle needle is no longer capable of being closed but can be opened further, this indicates that nozzle 310 is soiled with particles. This deduction is allowed in particular when this jammed-open operating state does not occur on a regular basis, but rather only on a very temporary basis. In this case, an imperfectly-manufactured surface 310 of the nozzle can be ruled out as the cause of the jammed-open operating state.

For the case in which a soiling of the cross section of nozzle 310 was detected in method step Sb), the method according to the present invention provides that nozzle 310 is scavenged with fuel according to method step Sc, whereby the stroke of nozzle needle 330 is adjusted to an essentially maximum value. A particularly large amount of fuel under high pressure then flows through the nozzle of the injection valve, which washes away the undesired dirt particles. The nozzle is then free of dirt particles once more and can be closed properly again, resulting in proper functioning of the internal combustion engine.

Due to the setting of the maximum stroke of the nozzle needle during the scavenging procedure in method step Sc) (scavenging stroke), a particularly large amount of fuel is injected into the combustion chamber of internal combustion engine 100. This amount of fuel can definitely be greater than a nominal amount of fuel, which is required under rated operating conditions of the internal combustion engine. In some cases, this excess amount of fuel causes the internal combustion engine to produce higher torque. If this higher torque is not desired, the method according to the present invention and shown in FIG. 1 recommends various measures for offsetting the occurrence of this increased torque.

To accomplish this, it must first be determined in method step Sd) whether increased torque is even present. If it is, there is a first possibility, according to method step Sd1), for holding the torque of the internal combustion engine constant. According to this method, while scavenging is being carried out according to method step Sc), the duration of actuation $t_i$—during which time the maximum nozzle needle stroke is set—is reduced to the point at which the amount of fuel injected by the injection valve into the combustion chamber of internal combustion engine 100 does not exceed a specified mean amount of fuel. An alternative is a second possibility for holding the torque of the internal combustion engine constant. According to method step Sd2), while scavenging is being carried out according to method step c), a misfire is artificially induced during ignition in the cylinder in which the jammed-open operating state of nozzle needle 330 was detected. This misfire can be artificially induced by delaying the moment of ignition until the air-fuel mixture is no longer flammable and/or until the high-pressure efficiency of combustion is minimal.

Two further measures for holding the torque constant depend on the operating mode of the internal combustion engine.

If it is determined in a method step Sd') that internal combustion engine 100 is functioning in a "homogeneous operating condition", i.e., that slight increases in torque in accordance with the lambda efficiency curve are being produced, it is possible to hold the torque of the internal combustion engine constant by delaying the moments of ignition during scavenging until the ignition timing efficiency is adjusted according to the following formula (method step Sd3):

$$eta\_zw = (Md\_soll/Mi\_opt) \cdot (1/eta\_lam),$$

with $eta\_lam = f(lambda)$, $lambda = rl/rk\_soll$; and $rk\_soll = f(\text{scavenging stroke})$ wherein
  eta_zw is the ignition time efficiency;
  Md_soll is the target value for the engine torque and/or for the internal combustion engine (100);
  Mi_opt is the optimum engine torque and/or the optimal torque of the internal combustion engine (100);
  eta_lam is the λ efficiency;
  rl is the air mass; and
  rk_soll is the target value for the fuel mass.

If it is determined in method step Sd', however, that internal combustion engine 100 is operating in a "stratified-charge mode", this generally means there is an excess amount of air. As a result, slight-to-considerable increases in torque are produced, depending on the current operating point on the lambda efficiency curve, provided the mixture is flammable. In the case of stratified-charge operation, the torque can be kept constant by not carrying out at least some of the injection pulses—that normally take place during a multiple-injection cycle—before or after injection, according to method step Sc).

If the internal combustion engine is operated in the stratified-charge mode and a jammed-open injection valve is detected, a changeover should be made to the homogeneous operating condition, since, in this mode, torque can be limited by limiting the air mass supplied.

All approaches based on method steps Sd1), Sd2), Sd3) and Sd4) induce a limitation of the amount of fuel supplied to the combustion chambers of internal combustion engine 100, although the injection valve is opened to a maximum extent when it is operated with a scavenging stroke.

Independently of which of the versions is used to hold the torque constant, it is recommended, after scavenging is carried out, to implement a pause of a predetermined period of time before carrying out scavenging once more; refer to step Se). In this manner, incorrect actuation of the method according to the present invention and, in particular, of the scavenging according to step Sc) is prevented.

What is claimed is:

1. A method for operating an injection valve of an internal combustion engine (100), whereby the metering of fuel is adjustable not only by varying the injection time, but also by varying a stroke of a nozzle needle of the injection valve (120), comprising the following steps:
  a) The internal combustion engine (100) is monitored for proper function (Sa);
  b) A jammed-open operating state of the nozzle needle of the injection valve (120) is detected, due to soiling in particular, whereby the nozzle of the injection valve (120) cannot be closed any further by the nozzle needle, but it can be opened further (Sb); and
  c) The nozzle is scavenged with fuel by setting an essentially maximum stroke of the nozzle needle to remove the soiling (Sc).

2. The method as recited in claim 1, wherein, in a), the internal combustion engine (100) is monitored to detect a richer air-fuel mixture (Sa1) and, in step b), the jammed-open operating state is detected when the richness of the air-fuel mixture is greater than a specifiable threshold value for richness, or the gradient of the enrichment is greater than a specifiable gradient threshold value for enrichment (Sb1).

3. The method as recited in claim 1, wherein, in step a), the internal combustion engine (100) or a single cylinder of the internal combustion engine (100) is monitored to detect misfires (Sa2), and, in step b), the jammed-open operating state is-possibly also-detected when the number of detected misfires of a cylinder per unit of time exceeds a specified threshold value for frequency (Sb2).

4. The method as recited in claim 1, wherein in step a) a pressure in one of the fuel accumulators (110) assigned to the internal combustion engine (100) is monitored (Sa3) and that, in step b), the jammed-open operating state is—possibly also—detected when the pressure in the fuel accumulator (110) falls below a specifiable threshold value for pressure, or when the course of the pressure in the fuel accumulator (110) over time deviates from a specifiable, expected course of pressure over time by more than specifiable tolerance values for pressure (Sb3).

5. The method as recited in claim 1, wherein, while scavenging is carried out according to step c), the duration of actuation $t_1$, during which time the maximum nozzle needle stroke is set, is reduced to the point that the fuel injected by the injection valve (120) into the combustion chamber of the internal combustion engine (100) does not exceed a specified means fuel value (Sd1).

6. The method as recited in claim 1, wherein, while scavenging is carried out according to step c), a combustion misfire is artificially induced in the cylinder in which the jammed-open operating state of the nozzle needle was detected, by delaying the moment of ignition for this cylinder unit the air-fuel mixture in the combustion chamber is no longer flammable and/or until the high-pressure efficiency of combustion is minimal (Sd2).

7. The method as recited in claim 1, wherein, when the internal combustion engine (100) operates in an homogenous operating condition, the moments of ignition are delayed-while scavenging, is carried out according to step c)-to the point at which the ignition timing efficiency is adjusted according to the following formula (Sd3):

$$eta\_zw=(Md\_soll/Mi\_opt).(1/eta\_lam),$$

with $eta\_lam=f(\text{lambda})$, lambda+$rl/rk\_soll$; and $$rk\_soll=f(\text{scavenging stroke})$$

wherein
eta_zw is the ignition timing efficiency;
Md_solle is the target value for the engine torque and/or for the internal combustion engine
Mi_opt is the optimum engine torque and/or the optimum torque of the internal combustion engine (100);
eta_lam is the λ efficiency;
rl is the air mass; and
rk_soil is the target value for the mass.

8. The method as recited in claim 1, wherein, the internal combustion engine (100) operates in the stratifie-charge mode, before or after the scavenging is carried out according to step c), at least a few of the generally numerous fuel injections designed to take place during a single multiple-injection cycle are not carried out (Sd4).

9. The method as recited in claim 1, wherein, the maximum stroke of the nozzle needle according to step c) is adjusted for only one cylinder of the internal combustion engine (100) and for only a few injection processes.

10. The method as recited in claim 9, wherein the execution of step c) is blocked for a specifiable period of time before it is allowed to continue (Se).

11. A computer program for a control device (130) of an internal combustion engine (100) with program code that is suitable for executing the method as recited in claim 1, when it runs on a computer or microprocessor.

12. The computer program is recited in claim 11, wherein the program code is stored on a computer-readable data carrier.

13. A control device (130) for controlling an injection valve (120) of an internal combustion engine (100), whereby the injection valve (120) is configured such that fuel supplied by said injection valve is capable of being metered into the combustion chambers of the internal combustion engine (100) by varying a stroke of a nozzle needle of the injection valve (120), wherein, with the aid of the control device (130), a jammed-open operating state of the nozzle needle of the injection valve (120) is detectable, in particular due to soiling of the nozzle, and, in this case an essentially maximum stroke of the nozzle needle is adjustable by the control device (130) for scavenging of the nozzle with fuel.

14. An internal combustion engine (100) with an injection valve (120) for injecting fuel, whereby the injection valve (120) is configured such that it enables metering of an amount of fuel supplied by it into the combustion chambers of the internal combustion engine (100) by varying a stroke of a nozzle needle of the injection valve (120), wherein a control device (130) is assigned to the internal combustion engine (100), with the aid of which a jammed-open operating state of the nozzle needle of the injection valve (12) is detachable, due to soiling in particular, and, with the aid of which said control device a substantially maximum stroke of the nozzle needle is adjustable in this case for scavenging the nozzle with fuel.

* * * * *